United States Patent Office 3,265,648
Patented August 9, 1966

3,265,648
CRYSTALLIZATION OF POLY-1-BUTENE IN THE PRESENCE OF STEARIC ACID OR BIPHENYL
John Boor, Jr., El Cerrito, and Edward A. Youngman, Lafayette, Calif., assignors to Shell Oil Company, New York, N.Y., a corporation of Delaware
No Drawing. Filed Dec. 28, 1961, Ser. No. 162,970
2 Claims. (Cl. 260—23)

This invention relates to an improved crystallization method for production of composites of solid crystalline polymers with crystallization modifying additives. More specifically this invention relates to an improved method for the crystallization of poly-1-butene.

Solid crystallizable poly-1-butene, generally referred to as "polybutene," is the product of polymerizing butene-1 by means of a low pressure catalyst of the Ziegler type. It is uniquely different from the other known poly-alpha-olefins such as polyethylene, polypropylene and the like in that it exhibits dimorphism, i.e., it can exist in two distinct crystalline modifications. Methods suitable for the preparation of polybutene have been described by Natta and coworkers, e.g., in the following publications: Atti Accad. Naz. Lincei 4 (8), 61 (1955); J. Polymer Sci. 16, 143 (1955); Angew. Chemie 68, 393 (1956); Chimica Industria 38, 751 (1956). The polymorphism of polybutene has been disclosed and discussed in the following publications: Atti Accad. Naz. Lincei Rendiconti Classe sci. fis. mat. e nat (8), 19, 404 (1955); J. Am. Chem. Soc. 77, 1908 (1955); Makromol. Chem. 21, 240 (1956); Experentia Suppl. VII, 21 (1957); Nuovo Cimento XV Suppl. 1, 9 (1960); Nuovo Cimento XV Suppl. 1, 52 (1960); Makromol. Chem. 35, 94 (1960) by Natta et al.; and J. Polymer Science, 62, 570 (1962) by Boor and Mitchell. It is found that on crystallizing from a melt or from solution, polybutene first assumes a crystalline structure which is unstable and which gradually turns into a second form which is stable at room temperature. The unstable form was designated by Natta et al., who first described it, as "modification 2" and the stable form as "modification 1."

Modification 2 is characterized by a helical chain structure of four-fold symmetry with an identity period of 6.8 Angstrom (A.). Modification 1 is characterized by a helical chain structure of three-fold symmetry with an identity period of 6.5 A.

Prior workers have found that the transformation from modification 2 to modification 1 is slow but can be accelerated by application of stretching or high pressures.

While polybutene has not yet achieved the commercial importance of polyethylene and polypropylene, it has similar useful characteristics which make it attractive for use as a molding resin or in textile applications. If it is to be used in a shaped form, such as a molded or extruded product, it is desirable that the shaped product attain its ultimate strength and dimensions quickly after forming. The slow transition from crystal modification 2 to modification 1, however, causes products formed from polybutene to change gradually in dimension since the two crystal modifications have different densities and also to increase gradually over a period of days in tensile strength, surface hardness and other properties in which modification 1 substantially exceeds modification 2.

It is an object of this invention to provide a method for modifying the crystallization of polybutene.

It is a more specific object to provide a method for accelerating the conversion of polybutene from crystal modification 2 to crystal modification 1.

Another object is to provide a practical method for producing shaped articles of polybutene which quickly acquire stable dimensions and high tensile and hardness properties characteristic of crystal modification 1.

It has been known in the past that the crystallization of a crystallizable material, such as a polymer, from its melt may sometimes be accelerated substantially by the addition of crystallization modifying compounds which are believed to act as nucleating agents for the crystallization. It has not been known, however, that crystallization modifying compounds can be used to modify the rate of transformation from one solid crystalline state to another solid crystalline state. It has now been found that the addition of certain crystallization modifying compounds to polybutene, prior to its final crystallization from a melt, results in greatly accelerating the transformation of polybutene from crystal modification 2 to crystal modification 1. These same crystallization modifying compounds, however, are found not to accelerate the crystal formation from the melt itself; they appear to act in a manner which is uniquely different from other crystallization-modifying nucleating agents heretofore used in other crystallizable polymers.

The crystallization modifying compounds suitable for use in this invention are crystallizable organic compounds which have melting points in the range between about 50° C. and about 200° C.

Effective modification of crystallization has been obtained with various compounds including crystallizable polymers such as polyethylene and polypropylene, crystallizable organic acids such as stearic acid, and crystallizable aromatic hydrocarbons such as biphenyl.

The crystallization modifying additives are preferablly employed in concentrations in the range from 2 to 5% by weight based on the polymer but some beneficial effect will be obtained in lower concentrations, e.g., as low as 0.1% by weight or less.

The process of this invention may be carried out with a single crystallization modifying compound or with a mixture of two or more of such compounds.

If desired, other additives may be present in the polymer. Additives which are conventionally added include antioxidants, stabilizers against ultraviolet radiation and the like. They may be added at any convenient stage of processing. While the polymer may be clear, unpigmented and unfilled, the invention may also be employed with polymers in which fillers and pigments have been added.

A special group of additives which may be present in the polymer are elastomeric polymers, added in amounts in the range from 3 to 35% to provide improved impact resistance and other improvements in physical properties of the polymer.

While this invention is particularly directed to the crystallization of polymer consisting completely of poly-1-butene it may also be employed with polymers in which a small amount of another unsaturated material such as another alpha-olefin has been copolymerized with the butene-1, provided a substantial proportion of the total polymer is present in chains of poly-1-butene having the typical crystal modifications thereof.

The polymers which are modified according to this invention are produced by polymerizing butene-1 by contact with a highly stereospecific catalyst system. A variety of stereospecific catalysts have been described in the literature. They are generally species or modifications of the so-called Ziegler catalysts disclosed by Natta and his coworkers.

Typical Ziegler type catalysts are the reaction products of halides, in order of preference, chlorides and bromides, of transition metals from subgroups A of groups 4 and 5 of the Mendeleev Periodic Table as illustrated on page 28 of Ephraim, "Inorganic Chemistry" 6th English edition, i.e., of Ti, Zr, Hf, Tl, V, Nb, or Ta with organometallic reducing agents in which the metal is from groups 1, 2 or 3. Preferred reducing agents are organoaluminum compounds and particularly aluminum alkyls, including aluminum alkyl halides. The most effective catalysts for the production of isotactic poly-1-butene known to date are those prepared from certain forms of titanium trichloride and certain aluminum alkyls and aluminum alkyl halides.

Following conventional terminology, reference to "crystalline" or "isotactic" polymer means, unless the context indicates otherwise, solid polymer having a high degree of crystallinity, usually at least 50% as determined by X-ray analysis or comparable methods. In general, polybutene having crystallinity of this order contains at most only a very small proportion of material which is extractable in boiling hydrocarbons such as pentane. Typically the proportion of highly crystalline polybutene which is extractable in boiling pentane or ethyl ether is less than 10% and usually less than 5%. Similarly "crystallizable" polybutene has a molecular arrangement that enables it to solidify from a melt in a highly crystalline structure. The generally practice in the art is to refer to crystalline or crystallizable polymer rather than partially crystalline or partially crystallizable polymer, even though olefin polymers of 100% crystal structure are not known to exist. Normally solid crystalline polybutene usually has a viscosity average molecular weight of at least about 10,000 and generally between 300,000 and 1,000,000. For convenience the molecular weight is usually expressed in terms of intrinsic viscosity. The intrinsic viscosity of polybutene, measured in Decalin at 150° C. is generally between 1.0 and 6.0 dl/g. but may be as low as 0.3 or less or as high as 11 or more.

Reference to polybutene herein, unless the context indicates otherwise, means the stereopolymer of 1-butene or a stereospecific copolymer of 1-butene with small amounts of other similar olefins or with other unsaturated compounds having predominantly the crystallinity typical of poly-1-butene.

Various methods may be employed for introducing the additive of this invention into the polymer. It is generally preferred to add the additive after the polymerization reaction has been completed, the active catalyst has been killed and at least the predominant part of the catalyst residue washed out of the polymer. The additive may, for example, be added to the washed polymerization slurry; the slurry is then dried and a dry mixture of additive and polymer is recovered. Alternatively, additive may be added to the dry polymer either when the polymer is in the form of a powder fluff or in the form of shaped pellets or the like. It is also possible to add the additive to the crystallizable polymer after it has been melted.

It is essential for effective results that a substantially homogeneous distribution of the additive in the molten form be obtained prior to the final crystallization of the polymer. To promote mixing of the additive in the polymer it is best to apply temperatures at which the polymer has a relatively low viscosity, i.e., temperatures exceeding the melting temperature of the polymer by from 20° to 50° C. The additives may be present in the polymer melt in true solution or in uniform dispersion, e.g. as colloidal suspensions of liquids or solids.

The additives are effective when the polymer melt is cooled to a temperature in the range from about 0° to about 40° C., and preferably between about 15° and about 30° C., and held at that temperature. Conversion from modification 2 to modification 1 is substantially complete in 24 hours or less when polybutene containing the additive of this invention, after being cooled from its melt, is held at temperatures in said range.

The invention will be further described by reference to the following examples, which are not to be interpreted as limiting the invention by are merely intended to be illustrative of preferred modes of practicing this invention.

Example

Crystallizable poly-1-butene was prepared by low pressure polymerization utilizing a $TiCl_3$-$AlEt_2Cl$ catalyst. The product was washed in the manner conventional for similar polyolefins and inhibited with an effective oxidation inhibitor. Additives of this invention were incorporated into portions of the polymer by tumbling, followed by milling of the mixture for 5 minutes at 170° C. The milled product was molded into tensile bars by compression molding. The following table illustrates results obtained with compounds acting as effective additives according to this invention.

| Additive | Amount Added, Percent by Weight | Offset Yield Point[a], p.s.i. | |
|---|---|---|---|
| | | Polymer A | Polymer B |
| None | | 1,017 | 915 |
| Crystalline polypropylene [b] | 2 | 1,901 | |
| | 5 | 2,114 | |
| | 2 | 2,114 | |
| Stearic acid | 3 | | 1,937 |
| Biphenyl | 5 | 2,286 | |
| | 3 | | 2,395 |

[a] Offset yield point determined by ASTM method D638–58T at about 15% elongation; determination made 23 hours after crystallization from melt.
[b] Crystalline commercial polypropylene; melting point 169° C.

We claim as our invention:

1. The method of accelerating the transformation of crystalline poly-1-butene from the crystal form which is characterized by a helical chain structure of 4-fold symmetry with an identity period of 6.8 A. and which is unstable at ambient temperatures to the crystal form which is characterized by a helical chain structure of 3-fold symmetry with an identity period of 6.5 A. and which is stable at ambient temperature, which comprises producing a melt of crystallizable poly-1-butene having homogeneously dispersed therein a crystallization modifying amount, in the range from 0.1 to 5% by weight, of stearic acid, and cooling said melt to a temperature between 0° and about 40° C.

2. The method of accelerating the transformation of crystalline poly-1-butene from the crystal form which is characterized by a helical chain structure of 4-fold symmetry with an identity period of 6.8 A. and which is unstable at ambient temperatures to the crystal form which is characterized by a helical chain structure of 3-fold symmetry with an identity period of 6.5 A. and which is stable at ambient temperature, which comprises producing a melt of crystallizable poly-1-butene having homogeneously dispersed therein a crystallization modifying amount, in the range from 0.1 to 5% by weight, of biphenyl, and cooling said melt to a temperature between 0° and about 40° C.

References Cited by the Examiner

UNITED STATES PATENTS

| | | | |
|---|---|---|---|
| 2,925,398 | 2/1960 | Coran et al. | 260—33.6 |
| 2,967,164 | 3/1961 | Aries | 260—23 |
| 3,017,238 | 1/1962 | Levine et al. | 260—23 XR |
| 3,018,263 | 1/1962 | Schneider | 260—33.6 |
| 3,112,160 | 11/1963 | Rush | 260—897 |
| 3,205,185 | 9/1965 | Lessells et al. | 260—23 |

FOREIGN PATENTS

| | | |
|---|---|---|
| 835,330 | 5/1960 | Great Britain. |

LEON J. BERCOVITZ, *Primary Examiner.*

ALFONSO D. SULLIVAN, *Examiner.*

R. A. WHITE, T. D. KERWIN, *Assistant Examiners.*